United States Patent

Cross

[11] Patent Number: 5,569,416
[45] Date of Patent: Oct. 29, 1996

[54] APPARATUS FOR AERATING FISH PONDS AND LAKES

[76] Inventor: Billy G. Cross, 614 West Lake Washington Rd., Glen Allan, Miss. 38744

[21] Appl. No.: 376,236

[22] Filed: Jan. 23, 1995

[51] Int. Cl.$^6$ ............................................. B01D 47/16
[52] U.S. Cl. .............................. 261/37; 261/90; 261/84
[58] Field of Search ............................. 261/83, 84, 88, 261/90, 37; 210/150, 151, 198.1, 205

[56] References Cited

U.S. PATENT DOCUMENTS

| | | | |
|---|---|---|---|
| 867,463 | 10/1907 | Yingling . | |
| 2,560,526 | 7/1951 | Thompson | 261/91 |
| 2,769,620 | 11/1956 | Davison | 261/98 |
| 2,809,817 | 10/1957 | Munters | 261/88 |
| 2,944,801 | 7/1960 | Katz et al. | 261/88 |
| 3,320,928 | 5/1967 | Smith | 119/3 |
| 3,415,501 | 12/1968 | Pilo | 261/89 |
| 3,450,124 | 6/1969 | Mauller, Jr. | 261/98 |
| 3,643,403 | 2/1972 | Speece | 55/53 |
| 3,739,912 | 6/1973 | Miller, Jr. | 261/88 |
| 3,882,205 | 5/1975 | Aoki | 261/37 |
| 4,101,608 | 7/1978 | Bracey | 261/36 R |
| 4,765,807 | 8/1988 | Henriksen | 55/51 |
| 4,972,801 | 11/1990 | Hunt | 119/3 |
| 5,138,975 | 8/1992 | Walsh | 119/3 |
| 5,158,037 | 10/1992 | Engelbart | 119/3 |
| 5,205,237 | 4/1993 | Skeggs et al. | 119/3 |

Primary Examiner—Robert J. Popovics
Attorney, Agent, or Firm—Polster, Lieder, Woodruff & Lucchesi

[57] ABSTRACT

An apparatus for dissolving gas into water from a lake, pond or the like, including a housing having a surface defining an enclosed volume, a water intake conduit having an external inlet end and an outlet end inside the housing between which water flows through the housing, a reservoir within the housing having first and second apertures, the first aperture positioned to receive liquid discharged from the outlet end of the liquid intake conduit, a liquid evacuating conduit having an inlet internal to the housing and an outlet external to the housing for conducting water through the housing, the inlet end of the liquid evacuating conduit being sealed about the second reservoir aperture to evacuate the water, a water atomizer within the housing and positioned between the liquid intake conduit outlet and the first reservoir aperture to atomize the water before the water enters the reservoir, and a gas intake conduit with an inlet end connected to the housing exterior and an outlet end inside the housing to conduct gas into the housing, the conduit outlet end being in flow communication with the atomizer to create a gas barrier through which the liquid subparts must pass before entering the reservoir.

17 Claims, 4 Drawing Sheets

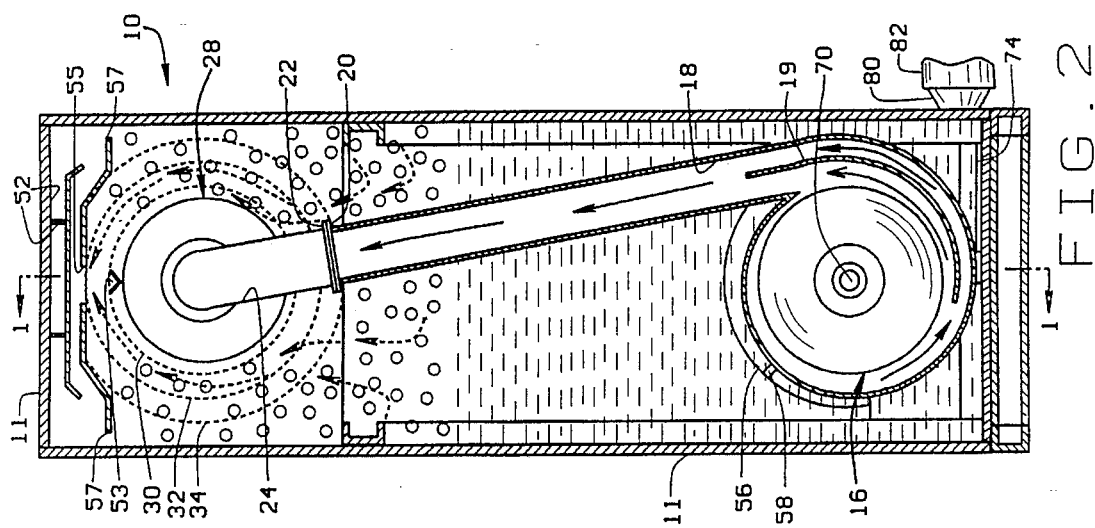
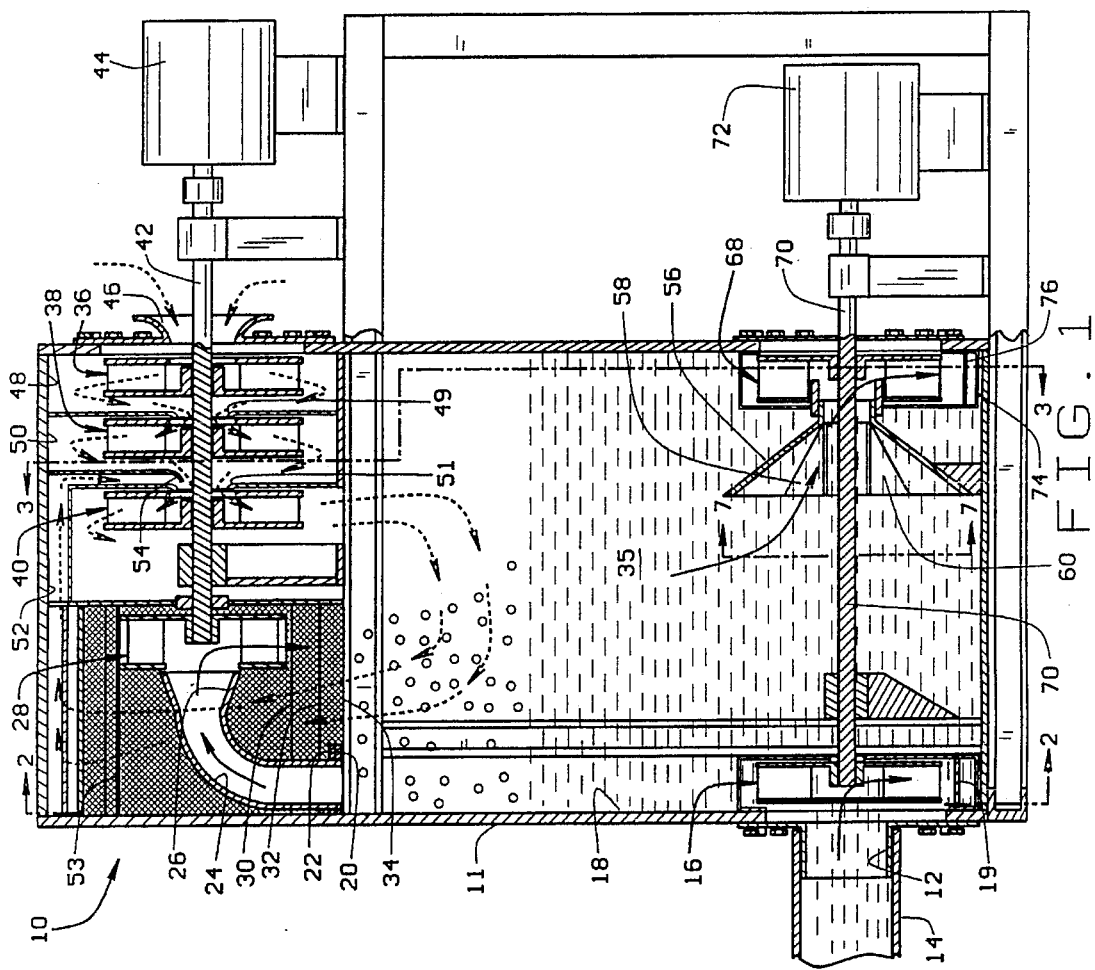

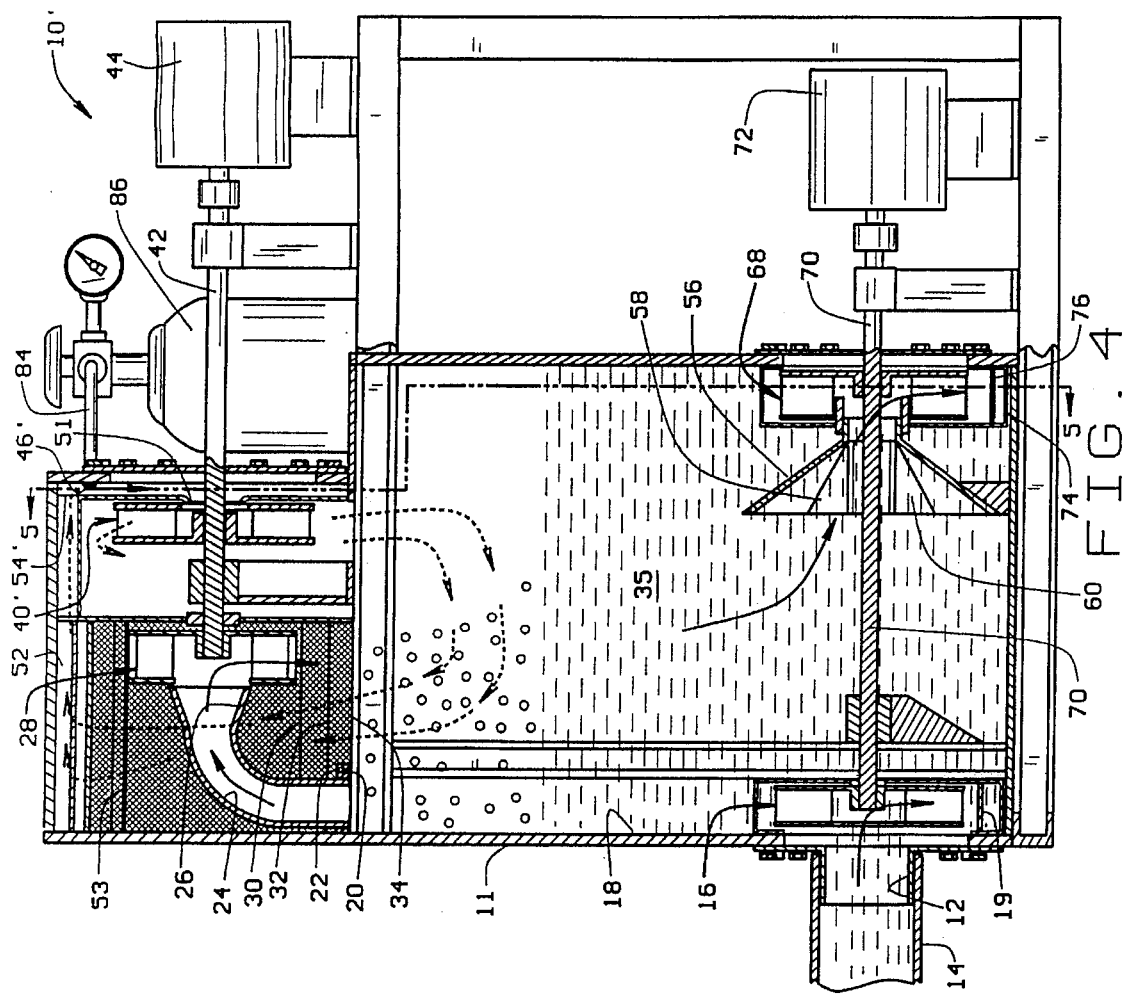
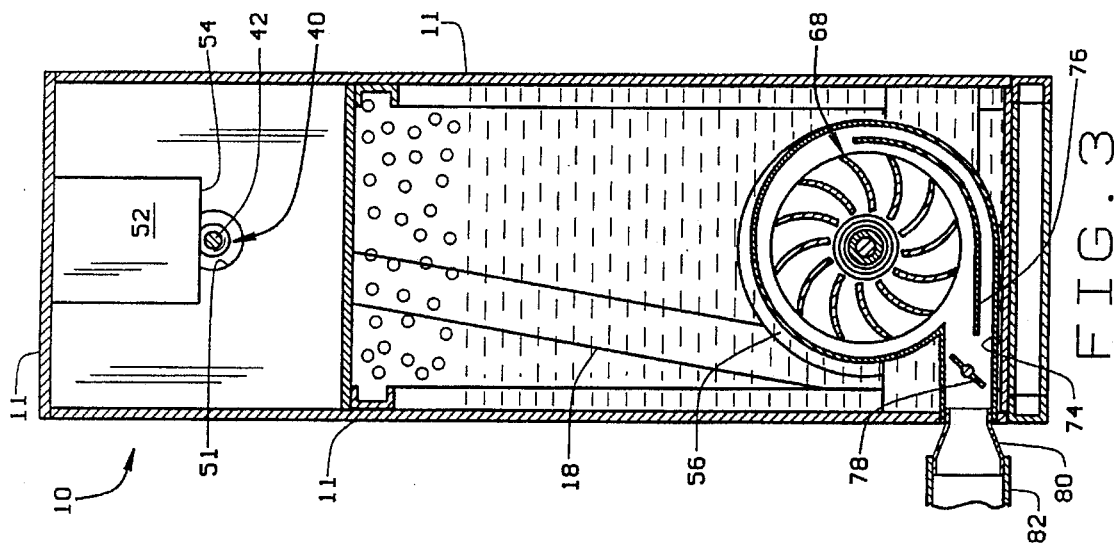

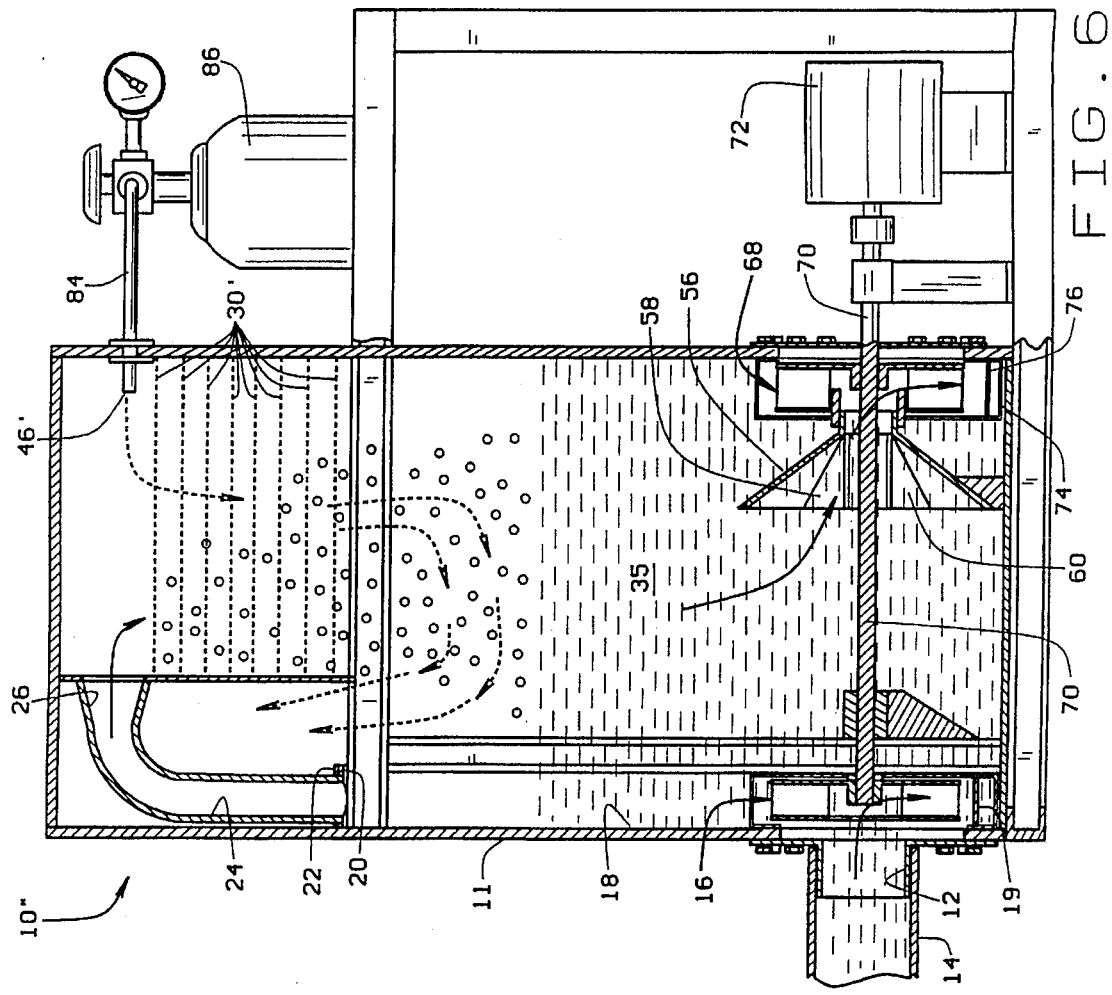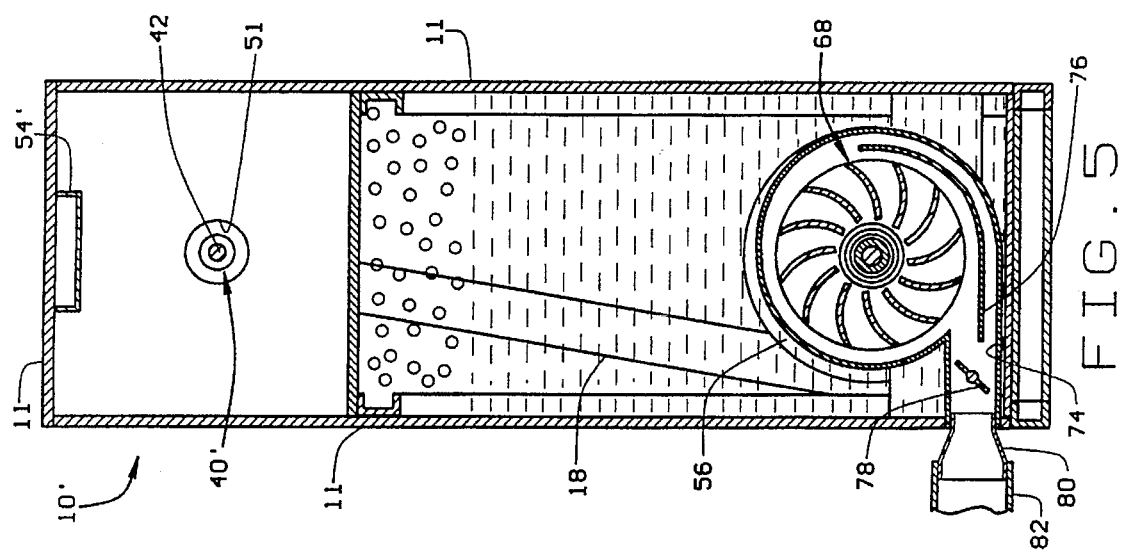

APPARATUS FOR AERATING FISH PONDS AND LAKES

BACKGROUND OF THE INVENTION

1. Field of the Invention

The present invention relates to an apparatus for aerating a fish pond or lake to increase the oxygen content of the water. More particularly, the apparatus of the present invention includes means for atomizing water as it is exposed to oxygen, thereby improving the degree to which the oxygen is absorbed into the water for the fish.

2. Background

A variety of aerators and bubbling systems for oxygenating water for the support of fish life are known in the art. Many prior art aerators employ impellers submersed, partially or totally, in water as means for circulating the water through portions of the aerators in which volumes of oxygen are maintained. The rate at which water is oxygenated in a given system is directly proportional to the area of interface between the water and the oxygen, i.e., the degree to which the liquid and the gas molecules are mixed. Although partially submersed impellers provide a secondary function of agitating the water in an effort to mix the water with the gas and, thereby, increase the rate at which oxygen is dissolved into the water, such aerator designs fail to maximize the area of interface, thereby leaving a need for improvement in the rate and extent to which oxygen is absorbed into the water.

In contrast to directing a flow of water through a chamber of oxygen, bubbling systems generally involve means for directing a flow of oxygen bubbles through a body of water. Although some bubbling systems even include means for recirculating oxygen through a body of water, bubbling systems, too, fail to maximize the degree to which the water and gas can be mixed.

There is, therefore, a need for an apparatus and method for oxygenating water to a greater extent to better support fish life, and at improved rates, than is provided by the known art.

SUMMARY OF THE INVENTION

The present invention provides an aerating apparatus and method designed to mix the oxygen gas and water from a fish pond or lake more quickly and thoroughly and, thereby, oxygenate the water more rapidly and completely than is available in the known art. The apparatus of the present invention includes a portable enclosed structure that can be positioned proximate to the lake or pond to be oxygenated. The enclosed structure houses water intake means, a reservoir, and water evacuating means in communication with the reservoir. A hose or pipe having one end submersed in the body of water and its opposing end affixed in fluid communication with the water intake means provides a conduit through which water to be oxygenated is drawn from the body of water and into the enclosed structure of the aerator apparatus. Similarly, a hose or pipe having one end affixed in fluid communication with the water evacuating means and its opposing end in fluid communication with the body of water provides the conduit through which oxygenated water is returned from the aerator to the body of water.

An oxygen chamber is located within the enclosed structure between the water intake means and the reservoir, the apparatus including means for injecting oxygen therein to create an oxygen barrier between the water intake means and the reservoir. Housed within the oxygen chamber are atomizing means positioned to receive water from the water intake means and deliver atomized water particles through the oxygen barrier and into the reservoir. The oxygenated water is then drawn from the reservoir by the water evacuating means, and passes out of the enclosed structure and into a given body of water.

In a first embodiment of the present invention, an aperture is positioned through the housing structure to bring outside atmosphere in communication with the oxygen chamber. A plurality of coaxial impellers are positioned within the oxygen chamber so that, upon being rotated, they draw the outside air into the oxygen chamber, forming an oxygen-containing barrier of air between the water intake means and the reservoir.

The atomizing means of the first embodiment of the present invention include an impeller affixed to the water intake means to receive the incoming water to be oxygenated. The impeller is spaced radially inwardly from a plurality of concentric cylindrical screens positioned coaxial to the impeller. Upon rotating, the atomizing impeller directs the flow of the incoming water radially outwardly through the concentric screens, causing the water to be converted into a mist of tiny droplets. These atomized droplets permeate the oxygen chamber, circulating through the oxygen-laden air barrier until gravitationally passing into the body of water contained in the reservoir.

A second embodiment of the present invention differs from the first embodiment in that the aperture through the housing structure is configured to engagedly receive the nozzle of an output line of a pressurized oxygen tank, thereby isolating the oxygen chamber from the outside atmosphere and yielding a purer oxygen barrier. Furthermore, only a single impeller is positioned within the oxygen chamber to circulate the pressurized oxygen therewithin to create the oxygen barrier between the water intake means and the reservoir.

A third embodiment of the present invention is similar to the second embodiment described above except the atomizing means of the second embodiment is replaced by a plurality of stacked horizontal screens positioned in the oxygen chamber to gravitationally receive water from the water intake means. Furthermore, pure oxygen enters the chamber under the force of its own gas pressure, alone, without the use of an impeller. As the water passes through the atomizing screens, it is converted into a mist of tiny droplets that are encapsulated in the oxygen as they gravitationally flow into the reservoir.

It is therefore a principal object of the present invention to provide an aerator apparatus that includes water atomizing means.

Another object is to teach the construction of water atomizing means employing a plurality of concentric cylindrical atomizing screens.

Yet another object is to teach the construction of water atomizing means employing a plurality of horizontal atomizing screens.

A further object is to provide an aerator apparatus that oxygenates water by mixing it with atmospheric air.

Still a further object is to provide an aerator apparatus that oxygenates water by mixing it with pure oxygen.

An additional object is to teach the construction of an aerator apparatus using at least one impeller to establish the oxygen barrier through which water must pass.

Another object is to provide an aerator apparatus that is portable.

Yet another object is to provide an aerator apparatus that divides the water into tiny subparts.

It is still another object to provide an aerator apparatus that more thoroughly mixes water molecules with oxygen molecules.

A further object is to provide an aerator apparatus that more rapidly oxygenates water.

Still a further object is to provide an aerator apparatus that more completely oxygenates water.

These and other objects and advantages of the present invention will become more apparent to those skilled in the art after consideration of the following specification taken in conjunction with the accompanying drawings wherein similar characters of reference refer to similar structures in each of the separate views.

BRIEF DESCRIPTION OF THE DRAWINGS

In the drawings that illustrate the preferred embodiments of the invention:

FIG. 1 is a partial cross-sectional front elevational view of a first embodiment of a portable water aerator apparatus constructed according to the teachings of the present invention.

FIG. 2 is a cross-sectional end view taken along line 2—2 of FIG. 1.

FIG. 3 is a cross-sectional end view taken along line 3—3 of FIG. 1.

FIG. 4 is a partial cross-sectional front elevational view of a second embodiment of a portable water aerator apparatus of the present invention.

FIG. 5 is cross-sectional end view taken along line 5—5 of FIG. 4.

FIG. 6 is a partial cross-sectional front elevational view of a third embodiment of a portable water aerator apparatus of the present invention.

DETAILED DESCRIPTION OF THE INVENTION

Figure 7:
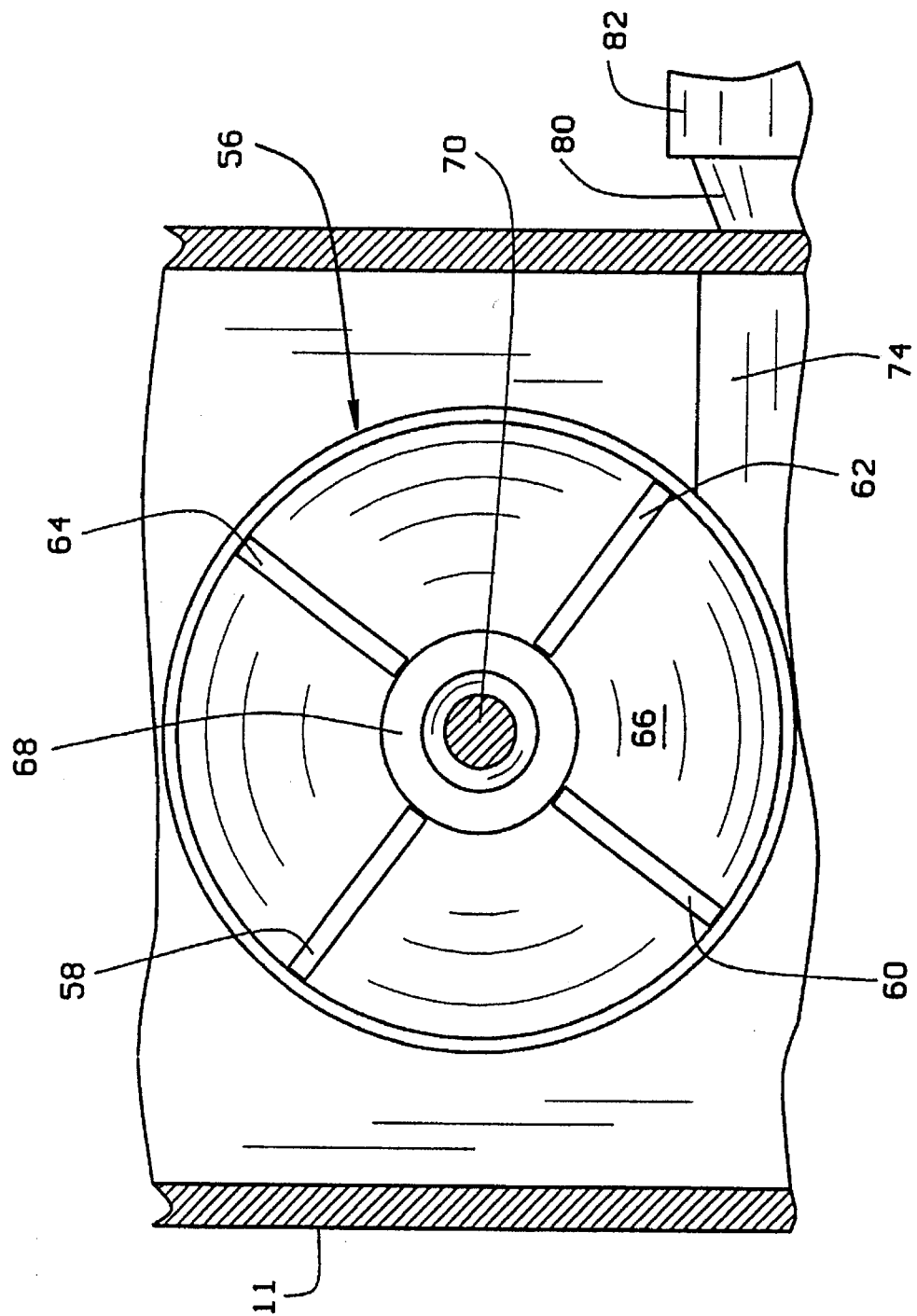
FIG. 7 is a partial cross-sectional view taken along line 7—7 of FIG. 1.

A first embodiment of the aerator 10 of the present invention is shown in FIG. 1, and includes a housing 11 having a water intake port 12 to which one end of an intake pipe or hose 14 can be affixed to deliver water from a body of water, such as a pond or lake, to the aerator 10. An intake impeller 16, housed within one end of an intake duct or channel 18 having a square cross-sectional area, is spaced inwardly of the intake port 12 in fluid communication therewith. As shown in FIG. 2, the end of the intake duct 18 housing the impeller 16 forms a double volute, i.e., the walls of the duct 18 form a scroll or primary volute longitudinally bisected by an intake baffle or secondary volute 19. The double volute configuration evenly distributes water pressure around the impeller 16. This reduces radial thrust to the impeller shaft 70, thereby preventing shaft 70 deflection and failure. Upon being rotated, the intake impeller 16 functions to draw or pump the water from the pipe or hose 14, through the intake port 12, and deliver it into and upwardly through an intake duct or channel 18.

As is shown in FIG. 2, the opposing end of the intake duct 18 forms a square flange 20 that sealably engages a square flange 22 formed in one end of an elbow-shaped tubular member 24 having a square cross-sectional area throughout its length except for a region 26 at its opposing end where it converts to a circular cross-sectional configuration. It is desirable to keep the flow of water constant as it travels through the tube 24, making it necessary to keep the cross-sectional area of the tubular member 24 constant throughout its length. To maintain a constant cross-sectional area in the square-to-round region 26 of the tube 24, it is necessary that the region 26 flare outwardly as it approaches the opposing end.

As water exits the tubular member 24, it is delivered to an atomizing impeller 28 that sprays the water radially outwardly through a series of three concentric cylindrical atomizing screens 30, 32 and 34 coaxial with, and spaced outwardly from, the atomizing impeller 28. As the water passes through the series of atomizing screens 30, 32 and 34, it is separated into tiny subparts, forming a water mist within the aerator 10. The mist is then gravitationally deposited into a reservoir 35 positioned beneath the atomizing screens 30, 32 and 34.

A trio of coaxial air intake impellers 36, 38 and 40 are mounted within the aerator 10 on a drive shaft 42 that also imparts torque to the atomizing impeller 28 from power delivered by a first aerator motor 44 mounted to the exterior of the aerator 10. As shown in FIG. 1, the first air intake impeller 36 draws atmospheric air through a fluted aperture 46 in the housing 11, and into a first chamber 48 in which the first air intake impeller 36 is housed. The second air intake impeller 38 draws air from the first chamber 48 through an aperture 49 and into a second chamber 50 in which the second air intake impeller 38 is housed. The third air intake impeller 40 draws air from the second chamber 50 through an air intake aperture 51 and forces the air downwardly against the surface of the water contained in the reservoir 35, whereupon the air circulates upwardly through the atomizing screens 30, 32 and 34 and into a feedback duct 52 having an output end 54 positioned above the aperture 51 so that the third air intake impeller 40 draws air from the feedback duct 52, as well. The interaction of the trio of air intake impellers 36, 38 and 40, creates a pressure within the housing 11 that is greater than atmospheric pressure. In this way, the atmospheric air drawn into the aerator 10 is circulated through the portion of the aerator 10 above the reservoir 35, enveloping the atomizing screens 30, 32 and 34. Therefore, as the water is atomized into a mist of water molecules, the mist is surrounded by, and mixes with, the circulating air, enabling a greater portion of the oxygen-deficient water molecules to bond with oxygen molecules contained in the air before gravitationally settling into the reservoir 35.

To reduce the amount of water that would otherwise enter the air feedback duct 52, a longitudinally V-shaped water deflector 53 is horizontally disposed above the atomizing impeller 28, the deflector 53 extending below, and along the length of, an air intake aperture 55 of the feedback duct 52, as is best shown in FIG. 2. A pair of drainage apertures 57 located in the feedback duct 52 permit what little water that passes through the air intake aperture 55 to gravitationally drain out of the feedback duct 52 and into the reservoir 35. Due to space constraints, an upper portion of the outermost atomizing screen 34 is replaced by a portion of the feedback duct 52.

When the aerated water is evacuated from the reservoir 35, it first passes through an anti-swirl device 56 that prevents turbulence from developing in the reservoir 35. The anti-swirl device 56 is conical, and has four swirl-preventing right-triangular fins 58, 60, 62 and 64 affixed to its interior wall 66 so that one edge of each fin is parallel to the axis of the cone, each fin being displaced from each adjacent fin by 90 degrees, as shown in FIG. 7.

After passing through the anti-swirl device 56, water is delivered to an evacuation impeller 68 coaxial with the anti-swirl device 56, the evacuation impeller 68 being mounted on the drive shaft 70 that also imparts torque to the intake impeller 16 from power delivered by a second aerator motor 72 mounted to the exterior of the aerator 10. As shown in FIG. 3, the evacuation impeller 68 is housed within one end of an evacuation duct 74 having a square cross-sectional area. Just as with the end of the intake duct 18 housing the intake impeller 16, the end of the evacuation duct 74 housing the impeller 68 forms a double volute including an evacuation baffle or secondary volute 76 longitudinally bisecting the primary volute formed by the surrounding walls of the evacuation channel 74. The double volute configuration functions to evenly distribute water pressure around the impeller 68 and reduce radial thrust to the impeller shaft 70, thereby preventing shaft deflection and failure.

A valve 78 located within the evacuation channel 74 beyond the baffle 76, provides means to regulate the flow of water being evacuated from the reservoir 35. An evacuation port 80 is affixed to the output end of the evacuation duct 74 to receive one end of a return pipe or hose 82 through which the oxygenated water is returned to the body of water to provide a more oxygen-rich environment for the benefit of the aquatic life.

A first alternative aerator embodiment 10', as seen in FIG. 4, shows the trio of air intake impellers 36, 38 and 40 replaced *by a single air-circulating impeller 40' spaced inwardly of a modified feedback duct output region 54' completely encompassing the air intake aperture 51, as seen in FIG. 5. Furthermore, the aperture 46 is no longer in communication with atmospheric air, but is modified to form an gas intake aperture 46' connecting the output end of a gas output line 84 from an oxygen gas tank 86 directly to the output region 54' of the feedback duct 52. The alternative aerator embodiment 10' offers the advantage of circulating only pure oxygen through the water vapor or mist, thereby improving the degree to which the water is oxygenated.

A second alternative aerator embodiment 10", as shown in FIG. 6, differs from the first alternative aerator embodiment 10' in that the atomizing impeller 28, the feedback duct 52 and the air intake impeller 40' have been removed. Furthermore, the concentric cylindrical atomizing screens 30, 32 and 34 have been replaced by a plurality of planar atomizing screens 30' horizontally disposed within the aerator 10" to separate the output of the tubular member 24 and the gas intake aperture 46' from the reservoir 35. The second aerator embodiment 10" provides the advantage of eliminating the need for the first aerator motor 44 because there is no atomizing impeller 28 nor air intake impeller 40' to drive, thereby reducing aerator manufacturing and operating costs.

Thus, there has been shown and described multiple embodiments of a pond aerator apparatus that fulfills all of the objects and advantages sought therefor. Many changes, modifications, variations and other uses and applications of the present device will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. An apparatus for aerating water in a lake or pond comprising:

a housing having a wall defining an enclosed volume, means for intaking water comprising first means for confining water flow extending through the housing wall, the first water confining means having an inlet for receiving water from outside the housing and an outlet for discharging water into the enclosed volume, a reservoir formed within the enclosed volume of the housing, the reservoir having an aperture positioned relative to the outlet of the first confining means no receive water discharged therefrom, means for evacuating water from the reservoir to outside the housing comprising second means for confining water flow extending through the housing wall, the second water confining means having an inlet for receiving water from within the housing and an outlet for discharging water externally of the housing, the inlet of the second water confining means being in flow communication with the reservoir to permit evacuation of water therefrom, means for atomizing water located within the housing and positioned between the outlet of the first water confining means and the reservoir aperture to atomize the water before the water enters the reservoir, and means for intaking gas comprising means for confining gas flow extending through the housing wall, the gas confining means having an inlet for receiving gas from outside the housing and an outlet for discharging gas to the enclosed volume of the housing, the outlet of the gas confining means being in flow communication with the water atomizing means to allow gas flowing from the outlet of the gas confining means to mix with the atomized water from the water atomizing means.

2. The apparatus as described in claim 1 wherein the water intake means include an intake impeller mounted in flow communication with the first water confining means for propelling water therethrough.

3. The apparatus as described in claim 2 wherein the intake impeller is rotatably mounted on a drive shaft in mechanical communication with a motor mounted externally of the housing.

4. The apparatus as described in claim 1 wherein the reservoir includes means for preventing water turbulence within the reservoir when water is evacuated therefrom said means for preventing turbulence being associated in water flow connection with the inlet of the second water confining means.

5. The apparatus as described in claim 1 further comprising means for regulating the rate of flow of water through the second confining means comprising a valve.

6. The apparatus as described in claim 1 wherein the water evacuation means include an evacuation impeller mounted in flow communication with the second water confining means for propelling water therethrough.

7. The apparatus as described in claim 3 wherein the water evacuation means includes an evacuation impeller rotatably mounted on the drive shaft.

8. The apparatus as described in claim 1 wherein the atomizer means include at least one atomizing screen positioned within the housing to be in flow communication with the outlet end of the first confining means.

9. The apparatus as described in claim 1 wherein the atomizer means include a plurality of stacked substantially planar horizontal atomizing screens retained within the housing in flow communication with the outlet end of the first confining means.

10. The apparatus as described in claim 1 wherein the atomizer means include an atomizing impeller and at least one atomizing screen mounted within the housing and extending about the atomizing impeller, the atomizing impeller further being positioned in flow communication with the outlet end of the first confining means of the water intake means to impel water delivered from the first confining means through the atomizing screen.

11. The apparatus as described in claim 10 wherein the atomizing impeller is rotatably mounted on a drive shaft in mechanical communication with a motor mounted externally of the housing.

12. The apparatus as described in claim 10 wherein the atomizing impeller is coaxial with, and spaced inwardly from, a plurality of concentric substantially cylindrical atomizing screens.

13. The apparatus as described in claim 1 wherein the gas intake means include at least one gas intake impeller mounted in flow communication with the gas confining means for propelling gas into the housing.

14. The apparatus as described in claim 13 wherein the gas intake impeller is rotatably mounted on a drive shaft in mechanical communication with a motor mounted externally of the housing.

15. The apparatus as described in claim 1 wherein the inlet of the gas confining means is in flow communication with atmospheric air, and wherein a plurality of coaxial gas intake impellers is rotatably mounted in flow communication with the gas confining means to force gas from the atmosphere through the outlet of the gas confining means.

16. The apparatus as described in claim 1 wherein a gas intake impeller is positioned in flow communication with the gas confining means and wherein the inlet of the gas confining means is sealed in flow communication to means for providing pure oxygen thereto.

17. An apparatus for oxygenating water in a lake or pond, the apparatus comprising a housing defining an enclosed volume, a water intake conduit having an inlet for receiving water external to the housing and an outlet for delivering water to the enclosed volume so that water enters the housing through the intake conduit, a reservoir formed within the housing and having an aperture positioned to receive water discharged from the outlet of the water intake conduit with the water falling by the force of gravity from the outlet of the water intake conduit to the reservoir aperture, a water evacuating conduit having an inlet positioned to be in flow communication with water contained in the reservoir and an outlet for delivering water from the reservoir to the exterior of the housing, water atomizing means located within the housing and positioned relative to the outlet of the water intake conduit so that at least part of the water delivered therefrom must past through the water atomizing means before gravitationally entering the reservoir to divide the water into subparts before entering the reservoir, and a gas intake conduit having an inlet for receiving gas external to the housing and an outlet for delivering gas to the enclosed volume between which gas enters the housing, the outlet of the gas conduit being in fluid communication with the water atomizing means to create a gas barrier through which the water subparts must pass before entering the reservoir.

* * * * *